March 14, 1944.   A. E. OSBORN   2,344,055
DUST PROTECTOR FOR CYLINDERS
Filed Nov. 7, 1941

Inventor:
Alden E. Osborn.

Patented Mar. 14, 1944

2,344,055

UNITED STATES PATENT OFFICE 2,344,055

DUST PROTECTOR FOR CYLINDERS

Alden E. Osborn, Mount Vernon, N. Y.

Application November 7, 1941, Serial No. 418,241

3 Claims. (Cl. 303—68)

The object of this invention is to reduce the wear on cylinders and parts therein that operate in a dusty atmosphere, such as railway car and vehicle brake cylinders. Such wear is due to the sucking of dust into the outer end of the cylinder thru the piston rod and vent openings therein when the piston moves back toward the pressure end. My invention is particularly suitable for use in connection with brake cylinders but it may be employed with cylinders used for other purposes in order to prevent dust being drawn into the cylinder. Various details not important to the disclosure of my invention have been omitted from the accompanying drawing since the exact internal construction of certain of the parts would vary greatly with different methods of use.

In the accompanying drawing

Figure 1:
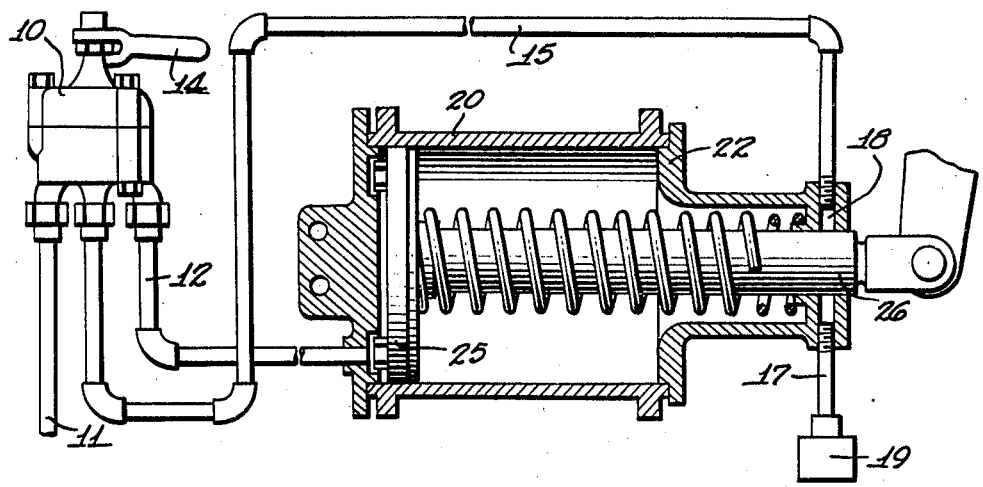
Figure 2:
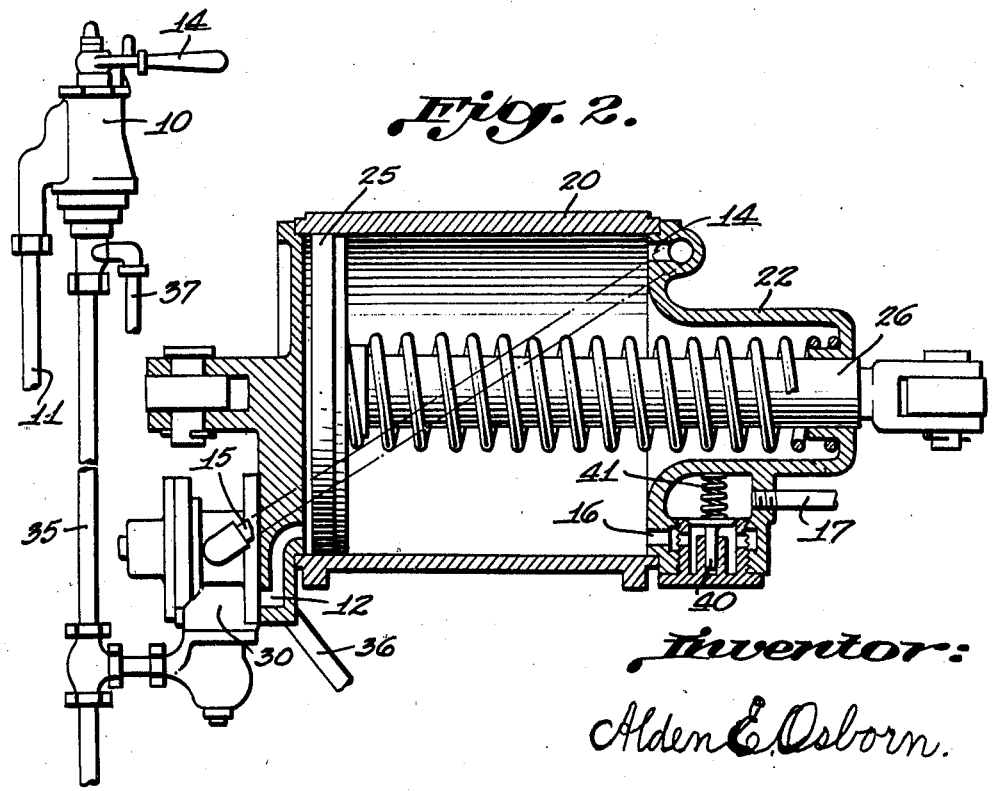

Figure 1 represents a partial sectional view of my invention applied to a mechanism operating on the straight air principle, such as is used on motor vehicles and street railways cars, and Figure 2 represents a partial sectional view of my invention applied to mechanism operating on the Westinghouse or automatic type of cylinder air supply, such as is employed with railway car brake mechanism.

In Figure 1 10 represents the control valve or engineer's or motorman's brake valve when the device is used on railway cars, 20 represents the cylinder which, in the case of railway car use, would be the brake cylinder, 25 represents the piston and 26 the piston rod that projects thru the cylinder head 22 and is, in turn, connected to the brake shoes of the car or vehicle or the other devices to be moved by the operation of the piston. The control valve 10 is supplied with air under pressure thru the pipe 11 and is connected to the cylinder 20 thru the pipe 12 so that air from the supply pipe 11 can be admitted to the cylinder and its amount controlled by the movement of the valve handle 14. The construction of the valve 10 is not a part of my invention and the valve may be provided with a single, or a number of exhaust or outlet ports, one or more of which communicate with the pipe 15 and my invention lies principally in the method of disposing of the exhaust air which passes thru this pipe as usually the exhaust from the valve is simply allowed to escape into the air freely or thru a suitable muffling device. In my invention, however, the pipe 15 communicates with the chamber 16 that is separated from the inside of the piston rod or non-pressure end of the cylinder and this chamber has an outlet opening shown as communicating thru the pipe 17 with a suitable muffler 19 that may be required in some applications. It is preferred that the outlet opening or pipe 17, or parts connected thereto, be a relatively small size and arranged so that, when the control valve 10 is operated to exhaust the air from the pressure end of the cylinder, some pressure would be developed in the chamber 18 surrounding the rod. Thus, during the time the piston 25 is returning to the normal released position and the air in the rod or non-pressure end of the cylinder is at a pressure lower than the outer atmosphere, there would be a pressure in the chamber so that dust would be blown away from the opening thru which the rod extends instead of being drawn into the cylinder as is usually the case.

Thus it will be noticed that, as the piston moves toward the pressure end of the cylinder, a partial vacuum would be produced in the non-pressure end unless air is admitted into the non-pressure end thru a fixed or controllable opening. Such a vacuum would be of value in certain applications of the device to control the rate of movement of the piston but it would usually draw dust thru the rod opening into the non-pressure end of the cylinder. With my device, however, dust would be blown away from around the rod opening, instead of being sucked into the non-pressure end of the cylinder by having the chamber 18 connected with the exhaust outlet from the control valve 10 arranged so that this chamber, when the valve is moved to release the air pressure from the pressure end of the cylinder, would contain air under pressure.

In the modification of my invention shown in Figure 2 and used with the Westinghouse or automatic air system, a triple valve 30 is employed, which triple valve is connected to the control or brake valve 10 and the main air train-line pipe 35 is provided with air from the main reservoir when the control valve 10 is moved to open the passages between this train-line pipe 35 and the supply pipe 11 that is permanently connected to the pressure air source or main reservoir. The control valve and triple valve operate in the usual manner in accordance with the Westinghouse or automatic system and the control valve 10 is provided with an air exhaust pipe 37 thru which air from the trainline is exhausted when the triple valve operates. The triple valve supplies, and is supplied with, air from the usual auxiliary air reservoir thru the pipe 36 and is provided with an exhaust port, or exhaust ports, which is, or are, in communication, thru the pipe 15, with the piston rod end of the cylinder 20, or with a channel 18 surrounding the rod end as in Figure 1. In Figure 2, a modified arrangement of the exhaust outlet is shown consisting of a check valve 40 that is held on its seat by a spring 41 so that a certain pressure rise must take place in the piston rod or non-pressure end of the cylinder before this end of the cylinder is in full communication with the atmosphere. The check valve 40 also permits the quick releasing of a relatively large amount of air from the rod end of the cylinder as it may be found in some cases, where the piston clearance volume at the rod end is relatively small, that a quick movement of the piston would cause a cushion of air that would restrain a further movement until some of this air leaked out. The function of the check valve 40 would be to lift and prevent this excessive air cushion as the valve could have a comparatively large area and the only pressure developed in the rod end of the cylinder would be that necessary to lift the valve against the spring 41. In some cases it may also be desirable to allow a slight leakage in the valve or to provide an independent opening so that the air pressure in this rod end of the cylinder would more quickly return to that of the atmosphere when the piston is at rest altho usually the leakage around the piston rod would be sufficient.

I claim:

1. The combination of a cylinder having a cover at each end and containing a piston operated by air pressure, a piston rod extending thru one said cover of said cylinder and connecting said piston and the mechanism to be operated by the movement thereof, a chamber formed in said cover thru which said rod extends and separated by a wall of said cover from the interior of said cylinder, controlling means for the admission and emission of air from the opposite end of said cylinder from that from which said piston rod extends, and a connection between an exhaust outlet of said controlling means and the chamber around the piston rod whereby air emitted from said exhaust outlet of said controlling means is conducted into said chamber to develop an air pressure in said chamber greater than that of the surrounding atmosphere when said controlling means is moved to cause the said emission of air from the opposite end of said cylinder from said piston rod.

2. A combination of a cylinder having a cover at each end and an outlet to the atmosphere at one end, a piston in said cylinder, a piston rod projecting thru one said cover and connecting said piston and the mechanism to be operated by the movement thereof, controlling means for the admission and emission of air from the opposite end of said cylinder from that from which said piston rod extends, and a connection between an exhaust outlet of said controlling means and the piston rod end of said cylinder whereby air emitted from said exhaust outlet of said controlling means is conducted into said piston rod end of said cylinder, and means comprising a valve in said outlet from said piston rod end of said cylinder whereby the air admitted into said cylinder end from said controlling means is retained in said cylinder end by the seating of said valve until the pressure therein exceeds that of the surrounding atmosphere when said controlling means is moved to cause the said emission of air from the opposite end of said cylinder from said piston rod.

3. The combination of a cylinder having a cover at each end, a piston in said cylinder, a piston rod extending thru one said cover and connecting said piston and the mechanism operated by the movement thereof, a chamber formed in said cover and surrounding said rod at the opening in said cover thru which said rod extends, and separated by a wall of said cover from the interior of said cylinder, and means for admitting compressed air into said chamber when said piston is moving into said cylinder and away from said cover to create an air pressure in said chamber greater than that of the surrounding atmosphere.

ALDEN E. OSBORN